(12) United States Patent
Cohen et al.

(10) Patent No.: US 7,051,091 B1
(45) Date of Patent: May 23, 2006

(54) REMOTE SYSTEM TO CONFIGURE MANAGEMENT CENTER OF POINT OF SALE TERMINALS

(75) Inventors: Yitzhak Cohen, Yahud (IL); Arie Glazer, Moshay Yagel (IL)

(73) Assignee: Lipman Electronic Engineering Ltd., Rosh Haayin (IL)

( * ) Notice: Subject to any disclaimer, the term of this patent is extended or adjusted under 35 U.S.C. 154(b) by 669 days.

(21) Appl. No.: 09/710,171

(22) Filed: Nov. 10, 2000

Related U.S. Application Data

(60) Provisional application No. 60/165,489, filed on Nov. 15, 1999.

(30) Foreign Application Priority Data

Nov. 15, 1999 (IL) .................................... 132942

(51) Int. Cl.
*G06F 15/177* (2006.01)
(52) U.S. Cl. .................... 709/221; 717/178; 705/26
(58) Field of Classification Search ................ 709/227, 709/229, 217–222, 223–226, 201–205, 244; 717/174–178; 705/26, 10, 14, 64; 345/744, 345/746; 707/100–104.1, 501, 513; 713/200–201, 713/235
See application file for complete search history.

(56) References Cited

U.S. PATENT DOCUMENTS

| | | | | |
|---|---|---|---|---|
| 5,535,407 A | * | 7/1996 | Yanagawa et al. ............. | 705/39 |
| 5,900,870 A | | 5/1999 | Malone et al. ............... | 345/333 |
| 5,936,860 A | | 8/1999 | Arnold et al. ......... | 364/468.01 |
| 5,987,135 A | | 11/1999 | Johnson et al. ............... | 380/25 |
| 6,016,957 A | * | 1/2000 | Ohki et al. .................. | 235/380 |
| 6,029,068 A | | 2/2000 | Takahashi et al. .......... | 455/426 |
| 6,041,183 A | | 3/2000 | Hayafune et al. ........... | 395/712 |
| 6,195,694 B1 | * | 2/2001 | Chen et al. .................. | 709/220 |
| 6,311,165 B1 | * | 10/2001 | Coutts et al. .................. | 705/21 |
| 6,466,972 B1 | * | 10/2002 | Paul et al. .................. | 709/222 |
| 6,470,288 B1 | * | 10/2002 | Keidel et al. ............... | 702/122 |
| 6,520,411 B1 | * | 2/2003 | Goodwin, III .............. | 235/383 |
| 6,532,435 B1 | * | 3/2003 | Aoshika et al. ............. | 702/188 |
| 6,615,183 B1 | * | 9/2003 | Kolls .......................... | 705/26 |
| 6,738,749 B1 | * | 5/2004 | Chasko ........................ | 705/17 |
| 2001/0015375 A1 | * | 8/2001 | Swartz et al. ............... | 235/383 |
| 2001/0016514 A1 | * | 8/2001 | Walker et al. ................ | 463/17 |
| 2002/0077889 A1 | * | 6/2002 | Kolls .......................... | 705/14 |

OTHER PUBLICATIONS

Lipman Electronic Engineering, Ltd., NURIT CC Management Software, pp. 1-15, Nov. 16, 1999.
Lipman Electronic Engineering, Ltd., NURIT Control Center (TCC), pp. 1-4, http://www.lipman.co.il/content/tc.html, Nov. 22, 2000.

* cited by examiner

*Primary Examiner*—John Follansbee
*Assistant Examiner*—Haresh Patel
(74) *Attorney, Agent, or Firm*—Ladas and Parry LLP

(57) ABSTRACT

A configuration builder useful in configuring software-containing hardware units which are serviced by a center which services a multiplicity of similar units having a plurality of different configurations, the configuration builder including:
  functionality enabling configuration of at least one software-containing hardware unit by a configurer; and
  functionality operative automatically in response to configuration of the at least one software-containing hardware unit for correspondingly configuring the center, thereby to enable the center to interface with the at least one software-containing hardware unit.
Methodologies and point of sale systems employing the configuration building functionality are also disclosed.

2 Claims, 9 Drawing Sheets

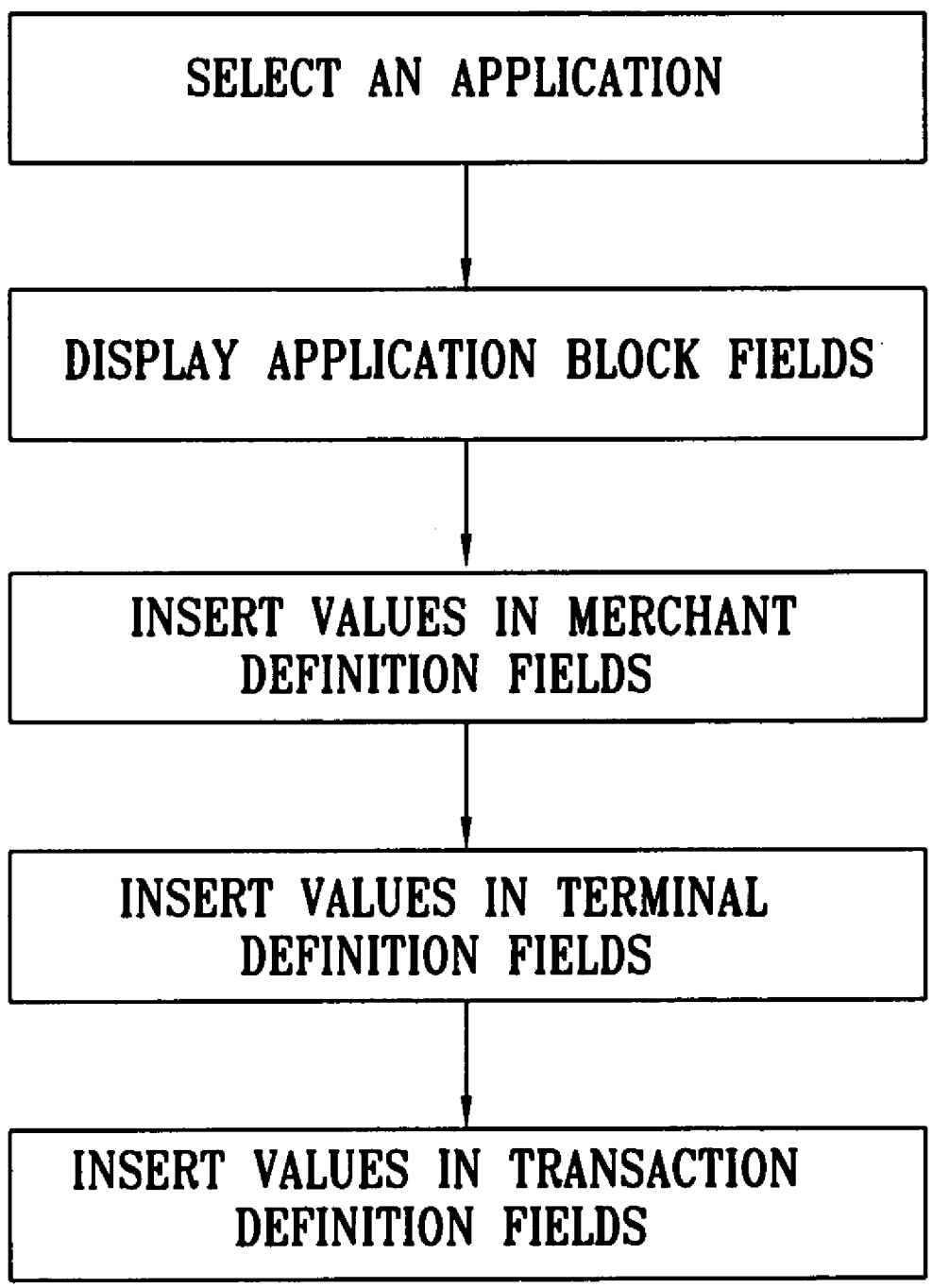

FIG. 4A

| Short | Block Name | Block Title | Type |
|---|---|---|---|
| CENTER | CENTER->Fil | Title | File |
| ▲ CHEQUE | Check Param | Check Parameters | Structure |
| CREDT1 | Credit Param | Credit Parameters | Structure |
| DEBIT | Debit Params | Debit Parameters | Structure |
| EBT | EBT Params | EBT Parameters | Structure |
| EDCLST | EDC Order | EDC Order | Structure |
| GENER | Generic Prm | EDC Generic Parameters | Structure |
| HOTKEY | Hot Keys | Hot Keys (Special, F1, F2,...,F8) | Structure |
| MRCHNT | Header | Merchant Header | Structure |
| POSMMI | POSMMI | USA block "POSMMI" | Structure |
| PRTCT | PRTCT->File | Download Protection | File |

FIG. 4D

Lip NURIT Control 06.13

Software Model: 2080 Nashville
Application: RT4_63E

Selection-Criteria Mask
Industry: Retail

Parameters
Save Model

Select Application

| Name | Min. NOS | Description | Version | Plug-in NAME | Minimum RAM Size | Industry Type | Max. Multiple Merchant | PLUGMVER |
|---|---|---|---|---|---|---|---|---|
| RT4_63E | 05.00 | Retail | 04.63 | RT4_63 | 128KB | Retail | 1 | 00.01 |
| RT4_63F | 05.00 | Retail | 04.63 | RT4_63 | 128KB | Retail | 1 | 00.01 |
| RT4_63G | 05.00 | Retail | 04.63 | RT4_63 | 128KB | Retail | 1 | 00.01 |
| RT4_63I | 05.00 | Retail | 04.63 | RT4_63 | 128KB | Retail | 1 | 00.01 |
| RT4_63M | 05.00 | Retail | 04.63 | RT4_63 | 128KB | Retail | 1 | 00.01 |
| RT4_63T | 06.00 | Retail | 04.63 | RT4_63 | 256KB | Retail, Restaurant | 1 | 00.01 |
| RTA4_62A | 05.01 | Full Retail+ | 04.62 | RT4_63 | 256KB | Retail | 1 | 00.01 |
| RTA4_63E | 05.01 | Full Retail+ | 04.63 | RT4_63 | 256KB | Retail | 1 | 00.01 |
| RTA4_63F | 05.01 | Full Retail+ | 04.63 | RT4_63 | 256KB | Retail | 1 | 00.01 |
| RTA4_63G | 05.01 | Full Retail+ | 04.63 | RT4_63 | 256KB | Retail | 1 | 00.01 |
| RTA4_63H | 05.01 | Full Retail+ | 04.63 | RT4_63 | 256KB | Retail | 1 | 00.01 |
| RTA4_63I | 05.01 | Full Retail+ | 04.63 | RT4_63 | 256KB | Retail | 1 | 00.01 |
| RTA4_63M | 05.01 | Full Retail+ | 04.63 | RT4_63 | 256KB | Retail | 1 | 00.01 |
| RTA4_63T | 06.01 | Full Retail+ | 04.63 | RT4_63 | 256KB | Retail | 1 | 00.01 |
| RTA4_63U | 06.01 | Full Retail+ | 04.63 | RT4_63 | 256KB | Retail | 1 | 00.01 |

OK    Cancel    DOC

REMOTE SYSTEM TO CONFIGURE MANAGEMENT CENTER OF POINT OF SALE TERMINALS

CROSS-REFERENCE TO RELATED PUBLICATIONS

Applicant hereby claims priority of U.S. Provisional Patent Application Ser. No. 60/165,489, entitled "ADAPTIVE MANAGEMENT CENTER ESPECIALLY USED FOR PONT OF SALE TERMINALS", filed Nov. 15, 1999.

The material on the compact discs labeled COPY 1 and COPY 2 is incorporated by reference. The compact discs are identified in the LIST OF APPENDICES below.

FIELD OF THE INVENTION

The present invention relates to point of sale systems generally.

BACKGROUND OF THE INVENTION

The following U.S. patents and other publications are believed to have possible relevance to the subject matter of the present invention: U.S. Pat. Nos. 6,041,183; 6,029,068; 5,987,135; 5,936,860 & 5,900,870.

A detailed explanation of the difference between the present invention and applicant's own prior art, which is believed to be the closest prior art, is set forth hereinbelow in the Detailed Description of a Preferred Embodiment.

SUMMARY OF THE INVENTION

The present invention seeks to provide a configuration builder suitable for use in configuring point of sale systems and a point of sale system and configuration methodology employing the configuration builder.

There is thus provided in accordance with a preferred embodiment of the present invention a configuration builder useful in configuring software-containing hardware units which are serviced by a center which services a multiplicity of similar units having a plurality of different configurations, the configuration builder including:

functionality enabling configuration of at least one software-containing hardware unit by a configurer; and functionality operative automatically in response to configuration of the at least one software-containing hardware unit for correspondingly configuring the center, thereby to enable the center to interface with the at least one software-containing hardware unit.

There is also provided in accordance with a preferred embodiment of the present invention, a configuration building method useful in configuring software-containing hardware units which are serviced by a center which services a multiplicity of similar units having a plurality of different configurations, the configuration building method including:

enabling configuration of at least one software-containing hardware unit by a configurer; and automatically in response to configuration of the at least one software-containing hardware unit, correspondingly configuring the center, thereby to enable the center to interface with the at least one software-containing hardware unit.

There is additionally provided in accordance with a preferred embodiment of the present invention a point of sale system including:

a multiplicity of point of sale (POS) terminals;

at least one management centers which interact with the multiplicity of point of sale (POS) terminals; and a configuration builder useful in configuring the multiplicity of point of sale terminals, the configuration builder including:

functionality enabling configuration of at least one software-containing hardware unit by a configurer; and functionality operative automatically in response to configuration of the at least one software-containing hardware unit for correspondingly configuring the center, thereby to enable the center to interface with the at least one software-containing hardware unit.

Preferably, the software-containing hardware units include point of sale terminals.

In accordance with a preferred embodiment of the present invention, the center interfaces with the at least one software-containing hardware unit for determining parameters of applications operative thereon.

Preferably, the center interfaces with the at least one software-containing hardware unit for determining parameters of applications operative thereon.

In accordance with a preferred embodiment of the present invention the configuration includes programming of an application to run on the software-containing hardware unit.

Preferably, the configuration includes defining a plurality of block structures.

In accordance with a preferred embodiment of the present invention, the configuration includes producing at least one flexible header file and at least one block definition file.

BRIEF DESCRIPTION OF THE DRAWINGS

The present invention will be understood and appreciated more fully from the following detailed description, taken in conjunction with the drawings in which:

FIG. 3 is a simplified flow chart of functionality for utilizing the results of the functionality of FIG. 2;

FIGS. 4A–4E are screen shots illustrating various stages in the functionality of FIGS. 2 & 3.

LIST OF APPENDICES

CD-ROM Appendix A includes software object code for carrying out a preferred embodiment of the invention.

Appendix A is included on Copy 1 and Copy 2 of the CD-ROMs attached herewith to the present application. Each CD-ROM includes the file ADAPTMGT.hex (Appendix A) of Nov. 8, 2000 and of length 120,551,213 bytes.

DETAILED DESCRIPTION OF A PREFERRED EMBODIMENT

The present invention will now be described with reference to an environment of a point of sale system comprising one or more management centers which interact with a multiplicity of point of sale (POS) terminals. In order for the uniqueness of the present invention to be fully understood, assignee's prior art system and methodology is initially described hereinbelow with reference to FIG. 1A.

Figure 1A:
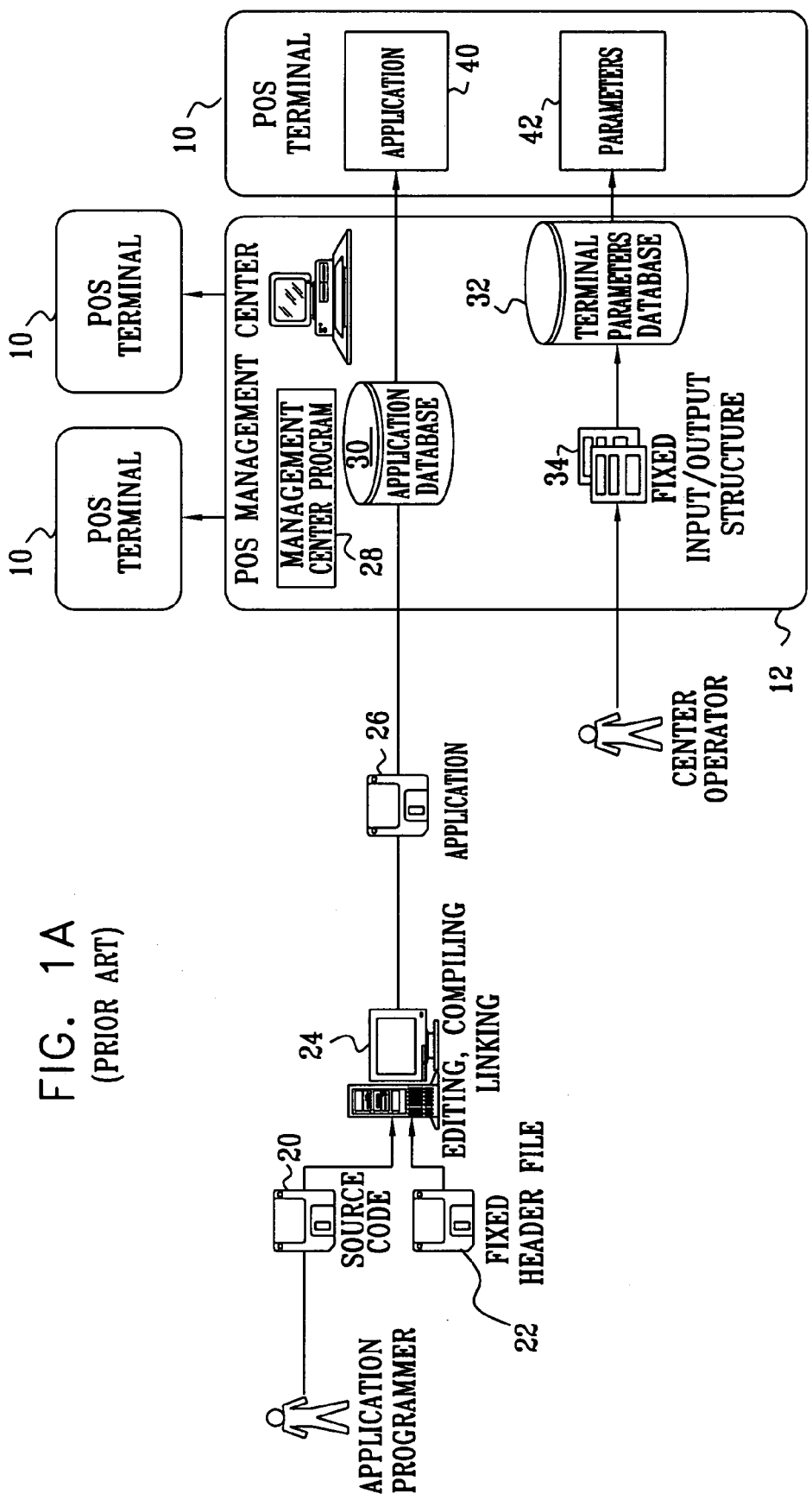
FIGS. 1A and 1B are simplified illustrations of prior art and present functionalities for configuring point of sale systems.

As seen in FIG. 1A, in the prior art a multiplicity of POS terminals 10 communicate with a POS management center 12. The POS terminals are typically NURIT terminals, commercially available from Lipman USA, Inc. of Syosset, N.Y., U.S.A. The POS management center 12 is typically a NURIT CC management center, also, commercially available from Lipman USA, Inc. Communication between POS terminals 10 and the POS management center 12 may be via a PSTN network or any other suitable wired or wireless communication network.

As seen in FIG. 1A, one or more software programmers typically write source code, designated by reference numeral 20 which, together with a fixed header file 22, is supplied to a computer system 24 which perform editing, compiling and linking thereof so as to provide applications 26.

The POS management center 12 typically includes a management center program 28, which controls the functionality of the management center 12, an applications database 30 which stores applications 26, a terminal parameters database 32, which stores parameters of various POS terminals 10 and a fixed input/output structure 34 which interfaces with the terminal parameters database 32 and requires a management center operator to enter parameters for given POS terminals in a fixed framework.

In each POS terminal 10, there is provided, inter alia, an application file 40 which receives downloads from applications database 30 from time to time and a parameters file 42, which receives downloads from parameters database 32 from time to time.

In the prior art, every change made at the POS management center 12 in the input/output structure 34 required that the applications programmers learn and understand the changed input/output structure in order to be able to write applications.

Moreover, many of the changes made to the input/output structure 34 were the result of requests made by the applications programmers. The result was a never-ending cycle of reconfiguration and relearning, which involved significant cost and delay in implementation changes in POS terminal functionality.

Furthermore, the POS management center operator was required to adapt previously set parameter settings to ensure compatibility with changed parameter structures. When many changes in the parameter structure were being made and a great number of terminals were involved, the management burden on the POS management center operator became unbearable and uneconomic.

Figure 1B:
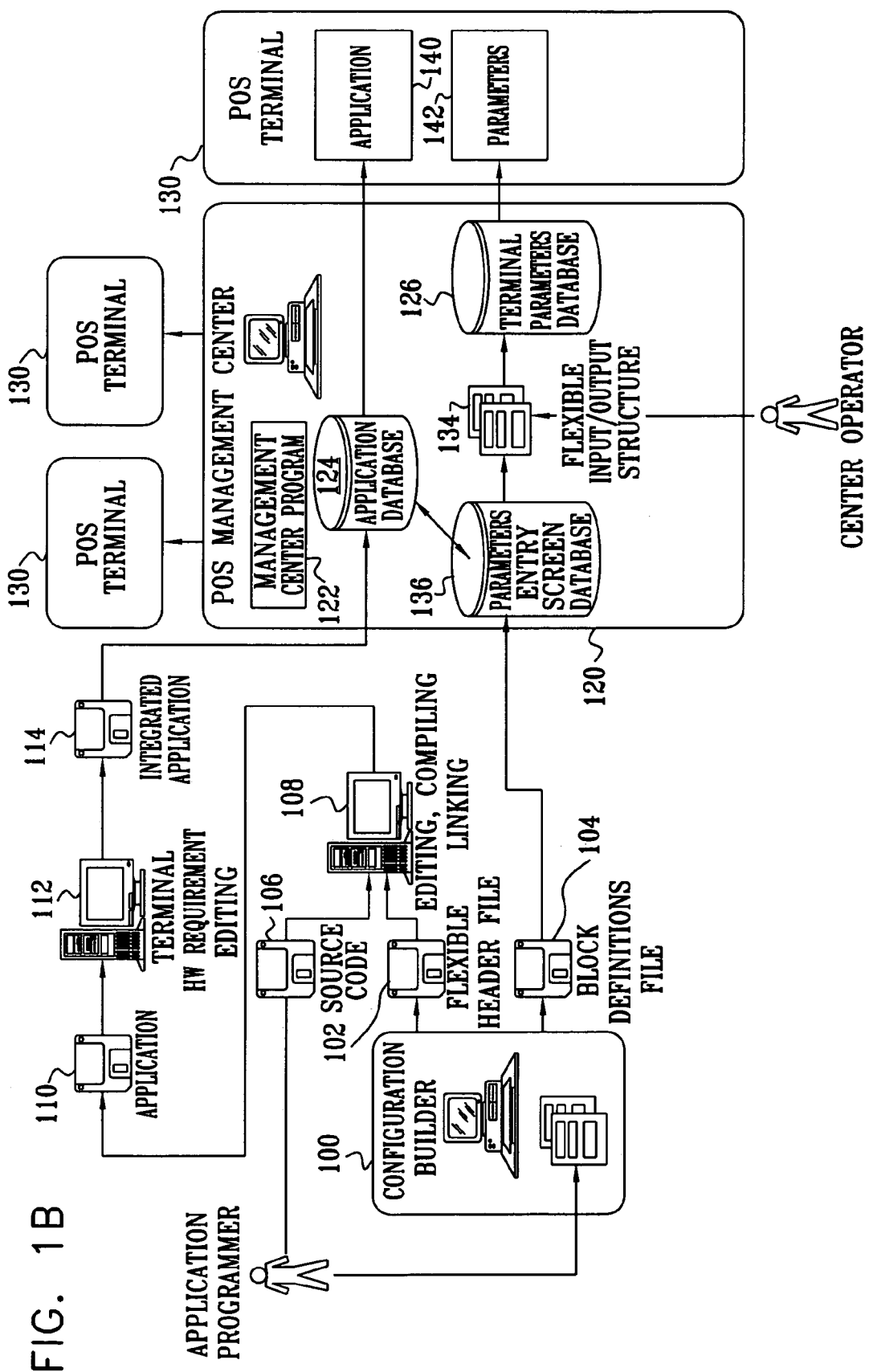

Referring now to the present invention, illustrated in FIG. 1B, it is seen that a configuration builder 100 constructed and operative in accordance with a preferred embodiment of the present invention is employed by an application programmer, preferably to write flexible header files 102 and block definitions files 104. Having written the flexible header files 102 and block definitions files 104, the software programmer writes source code 106 based on the structure defined in the flexible header files 102.

The source code 106 and the flexible header files 102 are supplied to computer system 108 which perform editing, compiling and linking thereof so as to provide applications 110.

Applications 110 are preferably then further processed by a computer system 112 which performs editing of the application to incorporate therewithin minimum hardware requirements at the POS terminal 130 for running the application. Typical hardware requirements include: minimum memory capacity, minimum modem baud rate, display requirements and card reader requirements.

The resulting integrated applications 114 are then supplied to a POS management center 120.

The POS management center 120 typically includes a management center program 122, which controls the functionality of the management center 120, an applications database 124 which stores applications 114, a terminal parameters database 126, which stores parameters of various POS terminals 130 and a flexible input/output structure 134 which interfaces with the terminal parameters database 126 and allows a management center operator to enter parameters for given POS terminals in a flexible framework.

In accordance with a preferred embodiment of the present invention, the block definitions file 104 is supplied to a parameter structure and parameter entry screen database 136 which stores a plurality of parameter entry screens which are used by the flexible input/output structure 134 for entry of parameters for given POS terminals 130 by a management center operator.

Parameter entry screen database 136 interfaces with applications database 124, in order that the parameter structure and the parameter entry screen shown to the management center operator is adapted to each given application.

In each POS terminal 130, there is provided, inter alia, an application file 140 which receives downloads from applications database 124 from time to time and a parameters file 142, which receives downloads from parameters database 126 from time to time.

In contrast to the prior art, wherein every change made at the POS management center 12 in the input/output structure 34 required that the applications programmers learn and understand the changed input/output structure in order to be able to write applications, in accordance with the present invention, most changes made at the POS management center 120 do not affect the work of the applications programmers.

Moreover, in accordance with the present invention and its flexible input/output structure 134, few or no changes need be made to the input/output structure 134 as a result of requests made by the applications programmers. This avoids the prior art never-ending cycle of reconfiguration and relearning, which involved significant cost and delay in implementation changes in POS terminal functionality.

Furthermore, an operator of a POS management center 120 is no longer required to adapt previously set parameter settings to ensure compatibility with changed parameter structures since each application is accompanied by a parameter structure adapted thereto.

In the present invention, as distinguished from the prior art, every change made by the software programmer in the application using the configuration builder is automatically reflected in the parameters structure stored in database 136, which automatically interfaces with the applications database 124. This obviates the need for a POS management center operator to learn and understand the changed parameter structure in order to be able to configure each terminal. Furthermore, the POS management center operator is no longer required to adapt previously set parameter settings to ensure compatibility with changed parameter structures. When many changes in the parameter structure are being made and a great number of terminals are involved, the management burden on the POS management center operator resulting from software changes to and developments in applications and parameter structures is minimized.

Figure 2:
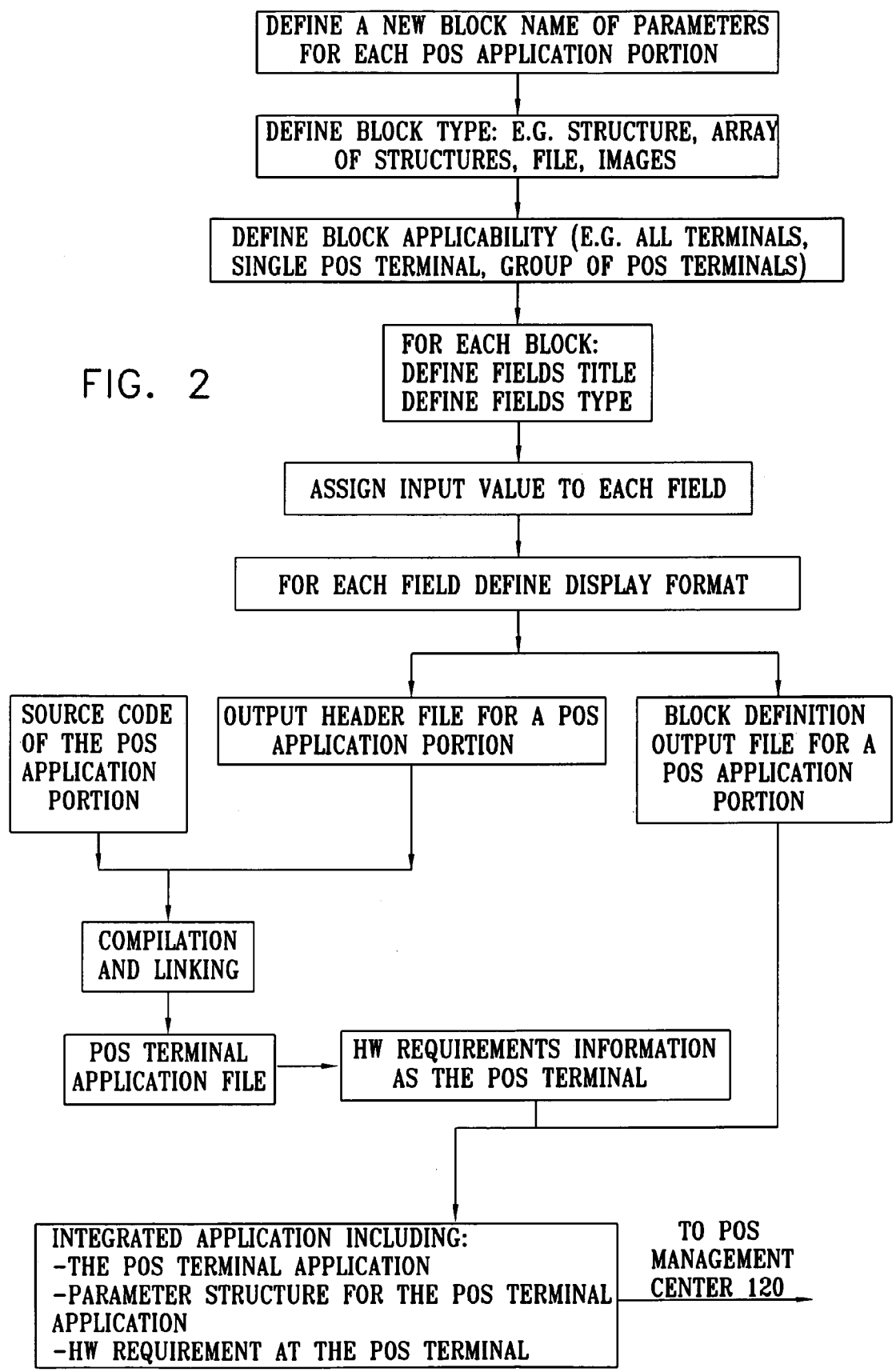
FIG. 2 is a simplified flow chart of functionality for configuring point of sale systems operative in accordance with a preferred embodiment of the present invention.

Reference is now made to FIG. 2, which is a simplified flow chart of functionality for configuring point of sale systems operative in accordance with a preferred embodiment of the present invention. A principal portion of the functionality of FIG. 4 takes place in the configuration builder 100 when employed by an application programmer. The remainder takes place in computer systems 108 and 112.

The application programmer initially defines names of blocks of parameters for each portion of a POS application. Examples of such blocks are include, for example, functionalities for dealing with checks, credit purchases, debit purchases, electronic benefit transfers (EBTs), electronic draft captures (EDCs), host-merchant transactions, man-machine interface functions.

A screen shot, presenting, inter alia, a listing of such block names, appears in FIG. 4A.

For each block defined by the application programmer, the programmer defines the type of block. Examples of types of blocks include, for example: structure, array, file and image. A typical structure applicable to a block relating to credit purchase functionalities includes the following parameters:

minimum transaction amount;
maximum transaction amount;
host ID;
communication protocol ID.

A typical array comprises a plurality of structures.

A typical file comprises, for example, a list of restricted credit cards.

A typical image comprises a logo of a merchant or a header of a merchant's receipt.

The application programmer may next define the applicability of each block. For example, the block may impact only a single POS terminal, a single type of POS terminals, a group of POS terminals belonging to a certain customer or an entire class of functionalities of many types of POS terminals.

Figure 4B:
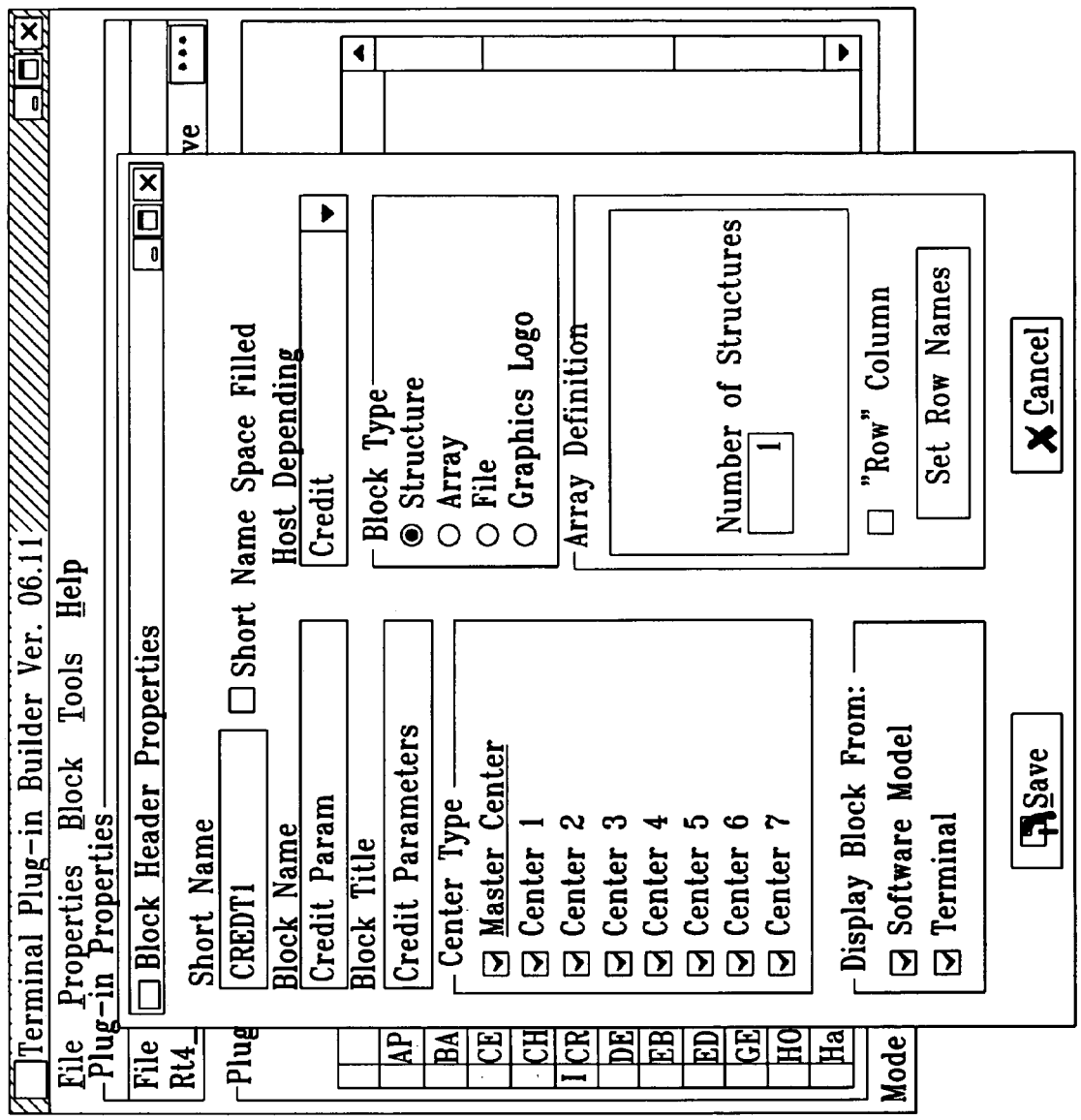

A screen shot, presenting, inter alia, a listing of selectable block attributes, including both the type of block and its applicability, appears in FIG. 4B.

The application programmer preferably next defines the titles of fields for each block of parameters corresponding to each portion of a POS application. Typical field titles for a typical block such as the block dealing with credit purchases include: host name, transaction type and help desk phone number. The type of the field is also preferably defined. Typical types of fields are: long, short and text.

The application programmer then assigns to each field of each block of parameters a value which serves as an input to a portion of a POS application to which the field corresponds.

The application programmer also defines the display format of each field at the input/output structure 134 of the POS management center 120. For example, the display format may include display as a label and/or as a hint and may define the location of the field on a display provided by the input/output structure 134.

Figure 4C:
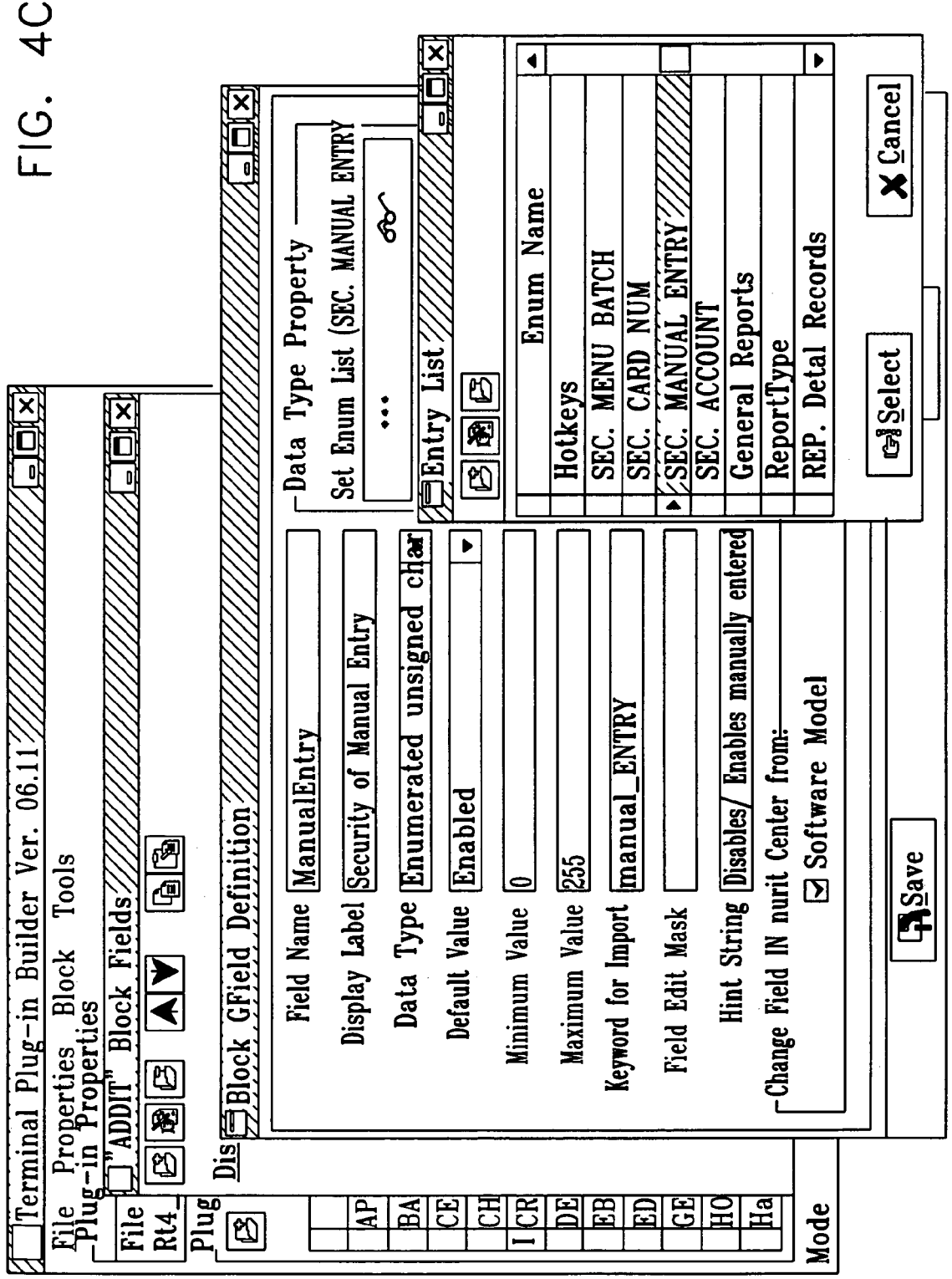

A screen shot, presenting, inter alia, field titles, field types and the values corresponding to a given field, appears in FIG. 4C.

At this stage, a header file, such as header file 102 (FIG. 1B), is output by the configuration builder 100. Normally each header file corresponds to one block of an application.

Also at this stage, a block definitions file, such as block definitions file 104 (FIG. 1B), is output by the configuration builder 100. Normally, each block definitions file 104 corresponds to one block of an application. The block definitions file typically includes information relating to the block type, field titles, field types, field values and corresponding display formats therefor.

As noted above, computer system 108 compiles and links the header file 102 for each given block with the source code 106 of the corresponding block of the POS application and produces an application. The resulting application 110 is supplied to computer system 112 at which hardware requirements information is appended to the application.

The resulting integrated application 114 includes the at least the following elements:

the POS terminal application written by the application programmer without using the configuration builder 100;

the parameter structure for the POS terminal application written by the application programmer using the configuration builder 100 and the hardware requirements at the POS terminal which are added downstream of the work of the application programmer.

The integrated application 114 is typically stored in applications database 124 in the POS management center 120.

Reference is now made to FIG. 3, which is a simplified flow chart of functionality for utilizing the results of the functionality of FIG. 2. The functionality of FIG. 3 is employed by a management center operator to configure a given POS terminal 130, having a given hardware configuration, for a given application and also to establish a basis for management communication between that terminal and the management center 120.

As seen in FIG. 3, once all necessary integrated applications have been received in database 124 of the POS management center 120, a management center operator may select one or more given applications stored in database 124. Upon selecting a given application, the operator is presented by the input/output structure 134 (FIG. 1B) with one or more screens, earlier defined by the application programmer using the configuration builder 100 (FIG. 1B) in order to adapt the selected application to a given POS terminal 130.

Typically, the management center operator may select an application, such as a restaurant application and may wish to adapt it to a given branch of a restaurant chain at a given location, having a given POS terminal hardware configuration. A screen shot of the type presented to the management center operator at this stage, appears in FIG. 4D.

Typically the management center operator inserts values into fields of application blocks, relating for example to merchant definition, terminal definition, transaction definition.

Examples of such fields relating to merchant definition include: host merchant ID, merchant location, merchant telephone number.

Examples of such fields relating to terminal definition include: terminal ID, terminal software ID and terminal hardware configuration ID.

Examples of such fields relating to transaction definition include: credit transaction capability YES/NO, check transaction capability YES/NO, . . . .

Figure 4E:
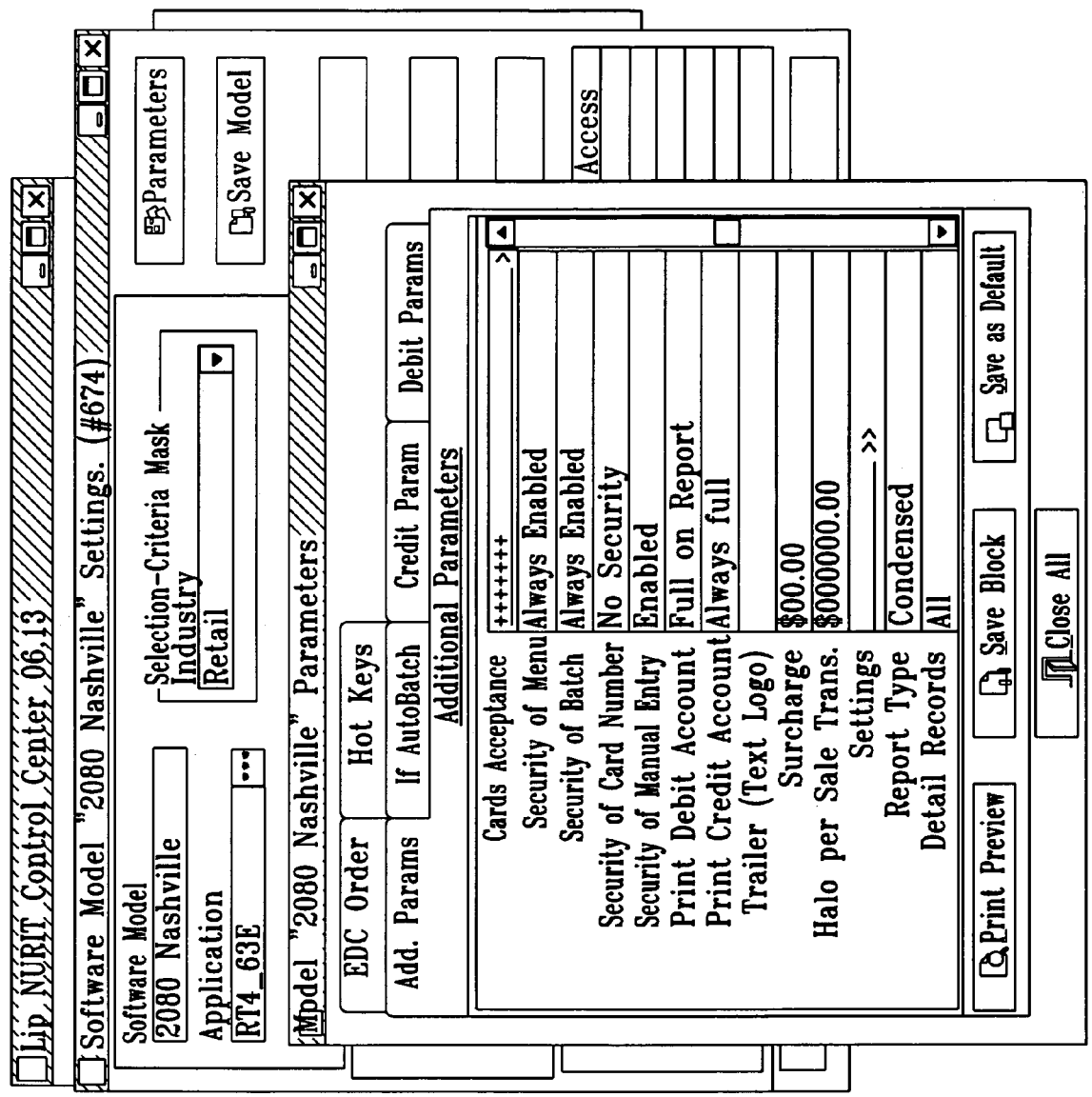

A screen shot corresponding to that of FIG. 4D showing entry of various parameter values appears in FIG. 4E.

It is appreciated that using the functionality of FIG. 3, which is predicated on the functionality of FIG. 2, the management center operator is enabled to easily configure disparate types of POS terminals 130 having disparate software and hardware configurations for disparate specific applications and operating environments.

Reference is now made to CD-ROM Appendix A, which includes software object code for carrying out a preferred embodiment of the invention. This code may be operated by installation thereof in accordance with the following installation instructions:

1) Provide a computer terminal, such as an Intel-based Pentium III 550 Mhz computer, 128 Mbyte RAM, 1

Gbyte Hard Disk, a modem and dial up line, configured with the Microsoft Windows 98/NT operating system;

2) Unhex the computer listing ADAPTMGT.HEX of Appendix A using HEX IT V1.8 or greater by John Augustine creating file ADAPTMGT.ZIP.

3) Decompress the file ADAPTMGT.ZIP using WINZIP version 6.2 or greater, extracting all files into their respective directories utilizing the WINZIP version 6.2 option "Use folder names".

4) In directory BDEINST execute the file SETUP.EXE and proceed to follow the default prompts.

5) In directory WNURITCC execute the file SETUP.EXE and proceed to follow the default prompts. This procedure installs the center files, including WNLSP.EXE 6) Execute the file NURITCDK.EXE This procedure installs the center files, including PLUGIN.EXE 7) To complete the installation, execute the file SERIAL.EXE This procedure installs the center files, including SERLBLD.EXE 8) Execute SERLBLD.EXE to generate a serial number for the center.

9) To run the configuration builder, execute the file PLUGIN.EXE to generate the header file and block definitions file.

10) To run the center, execute the file WNLSP.EXE. Select in this program "menu/files/import operating systems" and select the file: \OS_IMPORT\001_USA\OS_Data_01_06.OSN It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

The invention claimed is:

1. A method, tangibly embodied on a computer readable medium, to configure selected point-of-sale terminals and a management center controlling said selected point-of-sale (POS) terminals as well as non-selected point of sale (POS) terminals, the method comprising:

employing a configuration builder to create first and second linked files;

utilizing said first file by an application generator to create an application, wherein said application is not used for the non-selected point-of-sale terminals;

supplying said second file by the configuration builder to said management center;

utilizing said second file by a parameter structure generator to define a parameter structure which is adapted to said application and linked thereto;

supplying said application to said management center;

operating said management center, to select said application for said selected point-of-sale terminals and to associate said parameter structure with said selected point of sale terminals;

employing said parameter structure for setting parameter values suitable to both said selected application and said selected point-of-sale terminals;

automatically employing said parameter structure by said management center to configure an operator interface in said management center; and supplying said application and said parameter values to said selected point of sale terminals, wherein said management center automatically reflects changes made by a software programmer in said selected application using said configuration builder in said parameter structure stored in at least one database.

2. The method to configure selected point-of-sale terminals and a management center according to claim 1 and wherein said management center automatically configures at least one database in said management center according to said parameter structure.

* * * * *